(12) United States Patent
Feng et al.

(10) Patent No.: US 12,039,735 B2
(45) Date of Patent: Jul. 16, 2024

(54) SYSTEMS AND METHODS FOR AUTOMATIC SEGMENTATION OF ORGANS FROM HEAD AND NECK TOMOGRAPHIC IMAGES

(71) Applicants: Xue Feng, Lexington, KY (US); Quan Chen, Lexington, KY (US); Kanchan Ghimire, Arlington, VA (US)

(72) Inventors: Xue Feng, Lexington, KY (US); Quan Chen, Lexington, KY (US); Kanchan Ghimire, Arlington, VA (US)

( * ) Notice: Subject to any disclaimer, the term of this patent is extended or adjusted under 35 U.S.C. 154(b) by 399 days.

(21) Appl. No.: 17/529,188

(22) Filed: Nov. 17, 2021

(65) Prior Publication Data

US 2023/0154009 A1    May 18, 2023

(51) Int. Cl.
G06T 7/168    (2017.01)

(52) U.S. Cl.
CPC .... *G06T 7/168* (2017.01); *G06T 2207/10081* (2013.01); *G06T 2207/10088* (2013.01);
(Continued)

(58) Field of Classification Search
CPC .......... G06T 7/168; G06T 2207/10081; G06T 2207/10088; G06T 2207/20081;
(Continued)

(56) References Cited

U.S. PATENT DOCUMENTS

| 11,651,499 | B2* | 5/2023 | Wang | G06T 7/143 |
| | | | | 382/132 |
| 2017/0270671 | A1* | 9/2017 | Garnavi | G06T 7/187 |

(Continued)

Primary Examiner — Dhaval V Patel

(57) ABSTRACT

The present disclosure relates to a method and apparatus for automatic head and neck organ segmentation. The method includes: prepare a training dataset, wherein the step of preparing a training dataset comprises: receive 3D images covering head and neck region obtained by a CT system or an MRI system; receive metadata for each received 3D images, comprising patient orientation, pixel spacing, slice thickness and matrix size; receive corresponding 3D segmentation labels map for the received 3D images; and process the received 3D images and the corresponding 3D segmentation labels map by transforming to patient coordinate system and resampling to have a fixed spatial resolution and a fixed matrix size; build a deep learning framework using CNN models for organ segmentation; train CNN models using the training dataset and performing data emulation step during training by mirroring the processed 3D images and their corresponding processed 3D segmentation labels map from the training dataset; prepare a testing dataset, wherein the step of preparing a testing dataset comprises: receive 3D images covering head and neck region obtained by a CT system or an MRI system; receive metadata for each received 3D images, comprising patient orientation, pixel spacing, slice thickness and matrix size; and process the received 3D images by transforming to patient coordinate system and resampling to have a fixed spatial resolution and a fixed matrix size; deploy the trained CNN models on testing dataset, wherein the testing step comprises: mirror the processed 3D images in the left-right direction; predict on the processed 3D images and mirrored 3D images with individual prediction outputs as 3D probabilities map for organ segmentation; and improve the segmentation performance by averaging the 3D probabilities map outputs from the processed 3D images and mirrored 3D images; and post-process the 3D probabilities map outputs from the deep learning framework to obtain final 3D segmentation labels map for organ segmentation.

11 Claims, 6 Drawing Sheets

(52) U.S. Cl.
CPC ............... *G06T 2207/20081* (2013.01); *G06T 2207/20084* (2013.01); *G06T 2207/20216* (2013.01); *G06T 2207/30004* (2013.01)

(58) Field of Classification Search
CPC . G06T 2207/20084; G06T 2207/20216; G06T 2207/30004; G06T 7/11
See application file for complete search history.

(56) References Cited

U.S. PATENT DOCUMENTS

| | | | |
|---|---|---|---|
| 2020/0167930 A1* | 5/2020 | Wang | G06N 3/08 |
| 2021/0125707 A1* | 4/2021 | Rusko | G06N 3/045 |

* cited by examiner

200

210 Receiving three-dimensional (3D) CT or MR images covering head and neck region

212 Processing the 3D images to transform to patient coordinate system and have the same spatial resolution and matrix size

214 Building a deep learning framework using convolutional neural network (CNN) models for organ segmentation

216 Doubling the size of training dataset by emulating uncollected training data with mirrored images and their corresponding labels

218 Improving the performance by predicting on original and mirrored imaging and averaging the output probabilities

220 Post-processing the output from deep learning framework to obtain final organ segmentation

FIG. 2

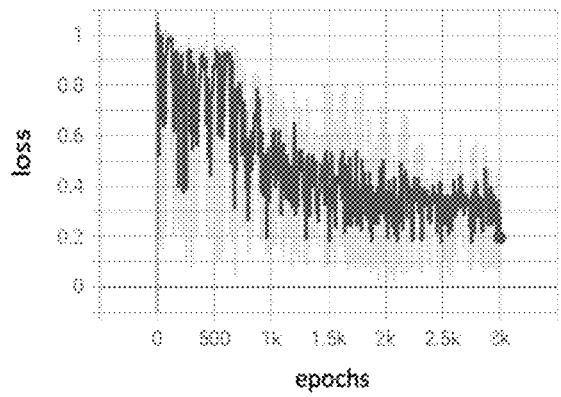
FIG. 4A
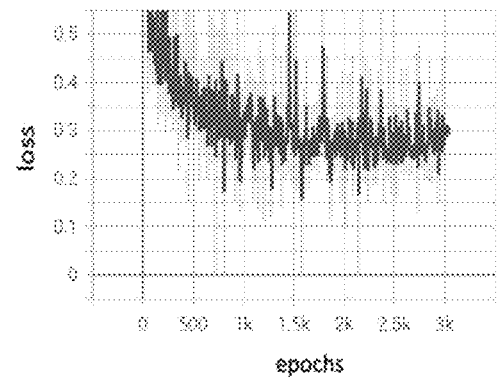
FIG. 4B
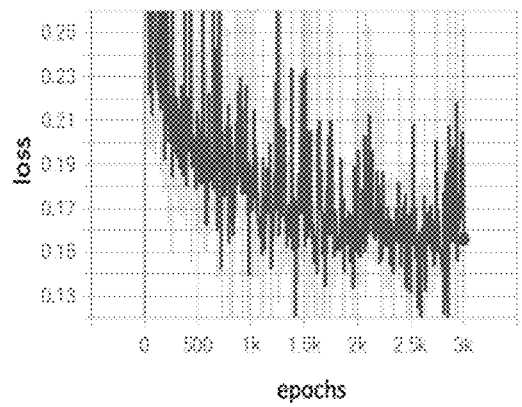
FIG. 4C
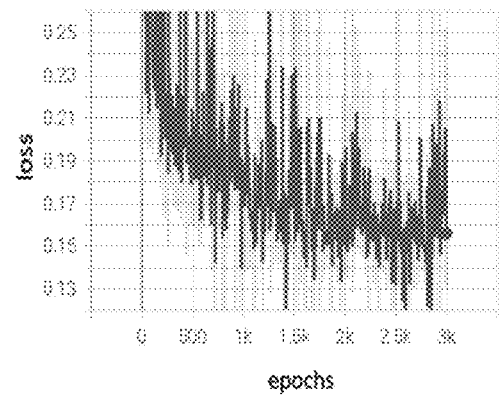
FIG. 4D
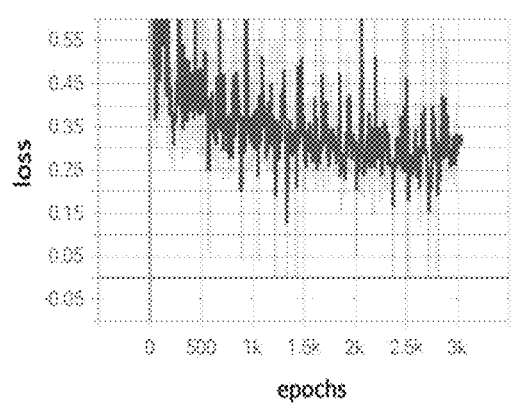
FIG. 4E
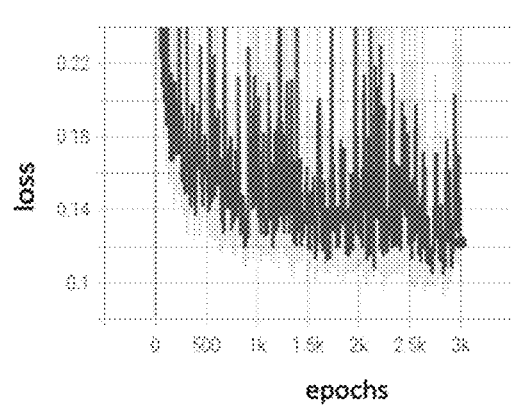
FIG. 4F
FIG. 4

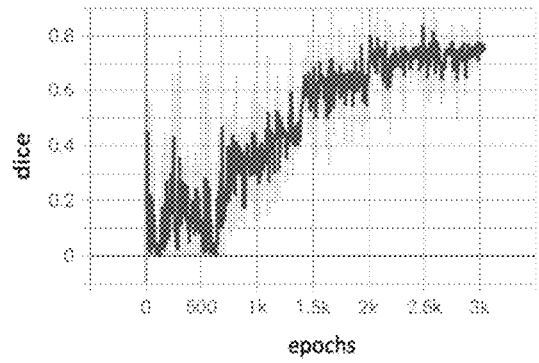
FIG. 5A
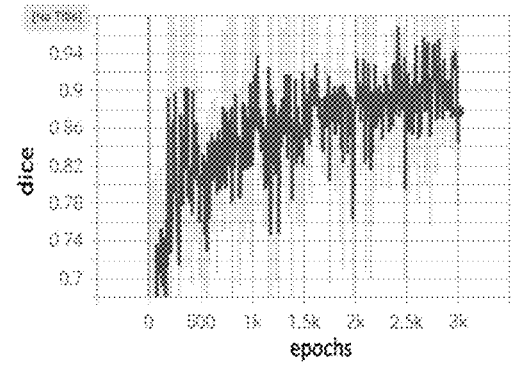
FIG. 5B
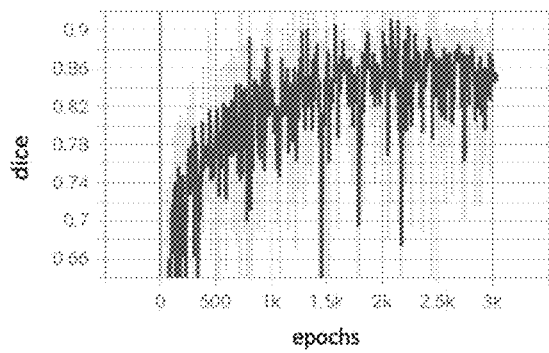
FIG. 5C
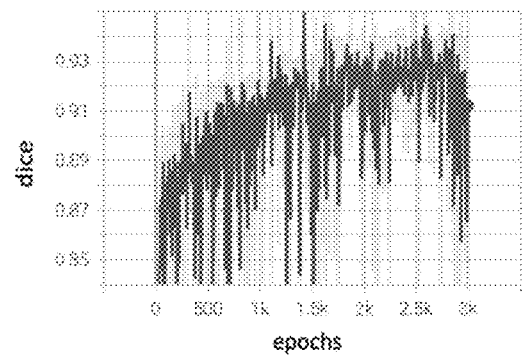
FIG. 5D
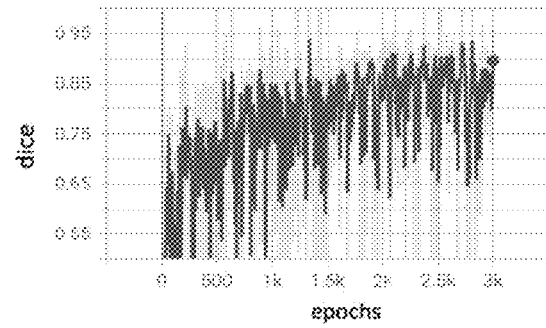
FIG. 5E
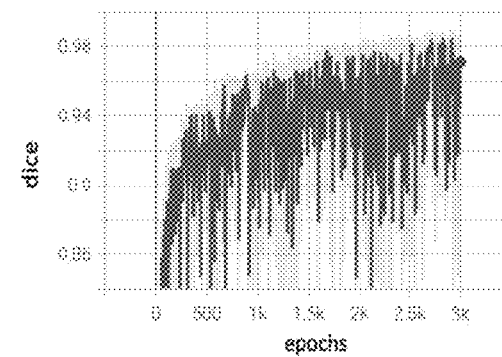
FIG. 5F
FIG. 5

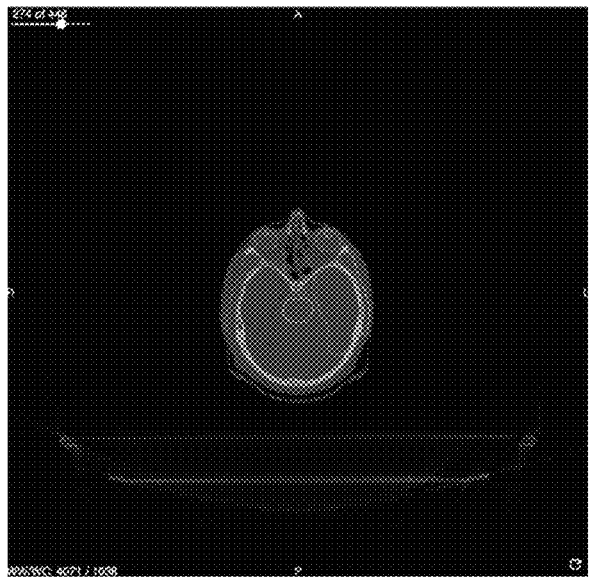
FIG. 6A
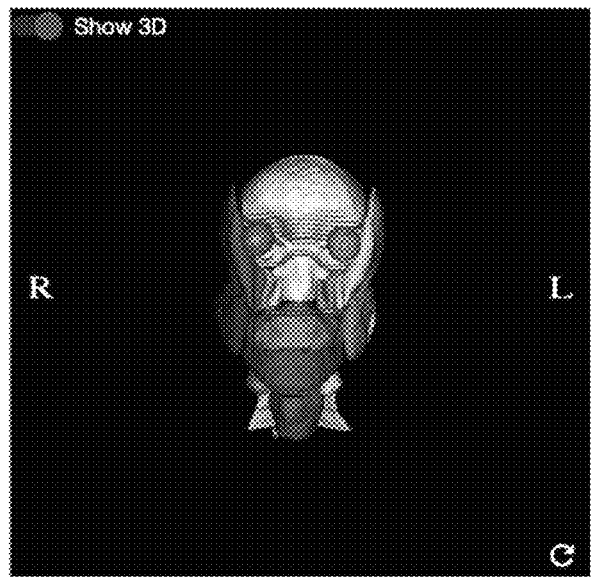
FIG. 6B
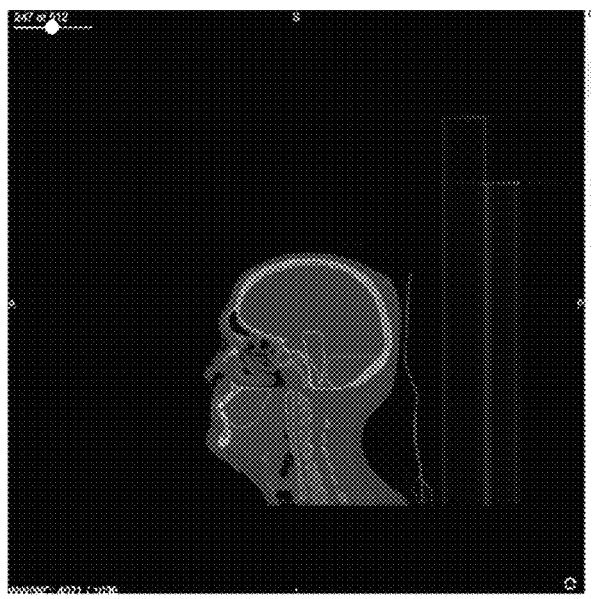
FIG. 6C
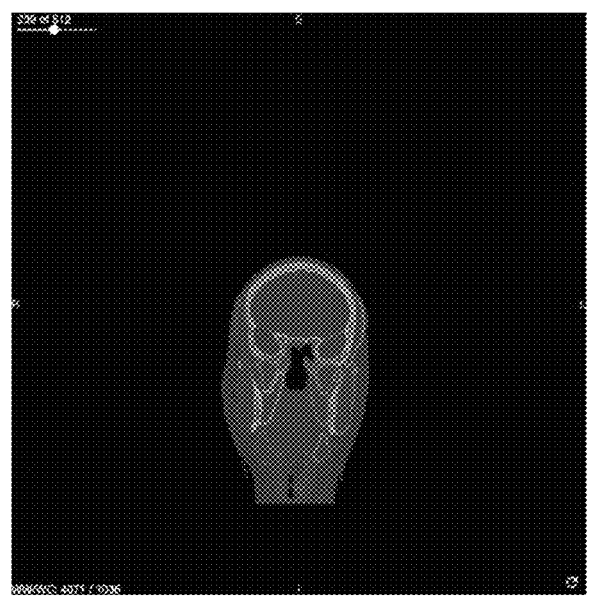
FIG. 6D
FIG. 6

SYSTEMS AND METHODS FOR AUTOMATIC SEGMENTATION OF ORGANS FROM HEAD AND NECK TOMOGRAPHIC IMAGES

STATEMENT OF GOVERNMENT INTEREST

This invention was made with government support under Grant No. R44CA254844 awarded by The National Institute of Health. The government has certain rights in the invention.

CROSS-REFERENCE TO RELATED APPLICATION

Not applicable.

FIELD

This disclosure relates to computed tomography (CT) and magnetic resonance imaging (MRI) operations that develop and validate a deep learning framework for automatic segmentation of organs from head and neck.

BACKGROUND

Accurate, fast, and reproducible organ segmentation is a key step in radiation treatment planning. In current clinical practice, manual contouring is most widely used for organ segmentation, which suffers from inter- and intra-observer variability. In addition, manual contouring also suffers from institutional variability, where different sites adopt distinct contouring atlases and labeling criteria. Automatic segmentation of organs from tomographic images eliminates the problems associated with manual contouring, including the significant human effort needed and bias. In recent years, deep learning has shown great success in many medical image segmentation applications, but there are still challenges associated with dealing with large 3D images. Furthermore, traditional deep learning models rely heavily on the size and diversity of training data. Therefore, emulating the uncollected training data has the potential to improve the deep learning models based on the availability of larger dataset.

SUMMARY

Examples of the present disclosure provide a method for automatic segmentation of head and neck organs from CT images or MR images in radiation treatment planning using a deep learning framework.

According to a first aspect of the present disclosure, a computer-implemented method for automatic segmentation of organs from head and neck region. The method may include prepare a training dataset, wherein the step of preparing a training dataset comprises: receive 3D images covering head and neck region obtained by a CT system or an MRI system; receive metadata for each received 3D images, comprising patient orientation, pixel spacing, slice thickness and matrix size; receive corresponding 3D segmentation labels map for the received 3D images; and process the received 3D images and the corresponding 3D segmentation labels map by transforming to patient coordinate system and resampling to have a fixed spatial resolution and a fixed matrix size; build a deep learning framework using CNN models for organ segmentation; train CNN models using the training dataset and performing data emulation step during training by mirroring the processed 3D images and their corresponding processed 3D segmentation labels map from the training dataset; prepare a testing dataset, wherein the step of preparing a testing dataset comprises: receive 3D images covering head and neck region obtained by a CT system or an MRI system; receive metadata for each received 3D images, comprising patient orientation, pixel spacing, slice thickness and matrix size; and process the received 3D images by transforming to patient coordinate system and resampling to have a fixed spatial resolution and a fixed matrix size; deploy the trained CNN models on testing dataset, wherein the testing step comprises: mirror the processed 3D images in the left-right direction; predict on the processed 3D images and mirrored 3D images with individual prediction outputs as 3D probabilities map for organ segmentation; and improve the segmentation performance by averaging the 3D probabilities map outputs from the processed 3D images and mirrored 3D images; and post-process the 3D probabilities map outputs from the deep learning framework to obtain final 3D segmentation labels map for organ segmentation.

According to a second aspect of the present disclosure, an apparatus for automatic segmentation of organs from head and neck region. The apparatus may include one or more processors, a display, and a non-transitory computer-readable memory storing instructions executable by the one or more processors. Wherein the instructions are configured to prepare a training dataset, wherein the step of preparing a training dataset comprises: receive 3D images covering head and neck region obtained by a CT system or an MRI system; receive metadata for each received 3D images, comprising patient orientation, pixel spacing, slice thickness and matrix size; receive corresponding 3D segmentation labels map for the received 3D images; and process the received 3D images and the corresponding 3D segmentation labels map by transforming to patient coordinate system and resampling to have a fixed spatial resolution and a fixed matrix size; build a deep learning framework using CNN models for organ segmentation; train CNN models using the training dataset and performing data emulation step during training by mirroring the processed 3D images and their corresponding processed 3D segmentation labels map from the training dataset; prepare a testing dataset, wherein the step of preparing a testing dataset comprises: receive 3D images covering head and neck region obtained by a CT system or an MRI system; receive metadata for each received 3D images, comprising patient orientation, pixel spacing, slice thickness and matrix size; and process the received 3D images by transforming to patient coordinate system and resampling to have a fixed spatial resolution and a fixed matrix size; deploy the trained CNN models on testing dataset, wherein the testing step comprises: mirror the processed 3D images in the left-right direction; predict on the processed 3D images and mirrored 3D images with individual prediction outputs as 3D probabilities map for organ segmentation; and improve the segmentation performance by averaging the 3D probabilities map outputs from the processed 3D images and mirrored 3D images; and post-process the 3D probabilities map outputs from the deep learning framework to obtain final 3D segmentation labels map for organ segmentation.

According to a third aspect of an example of the present disclosure, a non-transitory computer-readable storage medium having stored therein instructions is provided. When the instructions are executed by one or more processors or one or more graphic processing units of the apparatus, the instructions cause the apparatus to prepare a training dataset, wherein the step of preparing a training dataset comprises: receive 3D images covering head and neck region obtained by a CT system or an MRI system; receive metadata for each received 3D images, comprising patient orientation, pixel spacing, slice thickness and matrix size; receive corresponding 3D segmentation labels map for the received 3D images; and process the received 3D images and the corresponding 3D segmentation labels map by transforming to patient coordinate system and resampling to have a fixed spatial resolution and a fixed matrix size; build a deep learning framework using CNN models for organ segmentation; train CNN models using the training dataset and performing data emulation step during training by mirroring the processed 3D images and their corresponding processed 3D segmentation labels map from the training dataset; prepare a testing dataset, wherein the step of preparing a testing dataset comprises: receive 3D images covering head and neck region obtained by a CT system or an MRI system; receive metadata for each received 3D images, comprising patient orientation, pixel spacing, slice thickness and matrix size; and process the received 3D images by transforming to patient coordinate system and resampling to have a fixed spatial resolution and a fixed matrix size; deploy the trained CNN models on testing dataset, wherein the testing step comprises: mirror the processed 3D images in the left-right direction; predict on the processed 3D images and mirrored 3D images with individual prediction outputs as 3D probabilities map for organ segmentation; and improve the segmentation performance by averaging the 3D probabilities map outputs from the processed 3D images and mirrored 3D images; and post-process the 3D probabilities map outputs from the deep learning framework to obtain final 3D segmentation labels map for organ segmentation.

Other aspects and features according to the example embodiments of the disclosed technology will become apparent to those of ordinary skill in the art, upon reviewing the following detailed description in conjunction with the accompanying figures.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

Reference will now be made to the accompanying drawings, which are not necessarily drawn to scale.

FIG. 2 is a flow chart illustrating a method for automatic segmentation of organs from the head and neck region using a deep learning framework, according to an example of the present disclosure.

FIG. 4A is a loss curve for training on CT images during the CNN model training process for a subset of regions of interest (brain stem, chiasm, mandible, left and right optic nerves, left and right parotids, left and right submandibulars, and left and right eyes), according to an example of the present disclosure.

FIG. 4B is a loss curve for training on CT images during the CNN model training process for a subset of regions of interest (left and right mid ears, left and right temporo mandibular joints, spinal cord, left and right inner ears, left and right lens, and left and right temporal lobes), according to an example of the present disclosure.

FIG. 4C is a loss curve for training on CT images during the CNN model training process for a subset of regions of interest (larynx, oral cavity, thyroid, esophagus, left and right plexuses, lips, and pharynx), according to an example of the present disclosure.

FIG. 4D is a loss curve for training on CT images during the CNN model training process for a subset of regions of interest (left and right masseters, left and right temporalis, left and right lateral pterygoids, left and right medial pterygoids, and brain), according to an example of the present disclosure.

FIG. 4E is a loss curve for training on CT images during the CNN model training process for a subset of regions of interest (left and right cerebellum and left and right cochlea), according to an example of the present disclosure.

FIG. 4F is a loss curve for training on MR images during the CNN model training process for a subset of regions of interest (left and right parotids, left and right submandibular, and left and right group II and III neck lymph nodes), according to an example of the present disclosure.

FIG. 5A is a dice curve for training on CT images during the CNN model training process for a subset of regions of interest (brain stem, chiasm, mandible, left and right optic nerves, left and right parotids, left and right submandibulars, and left and right eyes), according to an example of the present disclosure.

FIG. 5B is a dice curve for training on CT images during the CNN model training process for a subset of regions of interest (left and right mid ears, left and right temporo mandibular joints, spinal cord, left and right inner ears, left and right lens, and left and right temporal lobes), according to an example of the present disclosure.

FIG. 5C is a dice curve for training on CT images during the CNN model training process for a subset of regions of interest (larynx, oral cavity, thyroid, esophagus, left and right plexuses, lips, and pharynx), according to an example of the present disclosure.

FIG. 5D is a dice curve for training on CT images during the CNN model training process for a subset of regions of interest (left and right masseters, left and right temporalis, left and right lateral pterygoids, left and right medial pterygoids, and brain), according to an example of the present disclosure.

FIG. 5E is a dice curve for training on CT images during the CNN model training process for a subset of regions of interest (left and right cerebellum and left and right cochlea), according to an example of the present disclosure.

FIG. 5F is a dice curve for training on MR images during the CNN model training process for a subset of regions of interest (left and right parotids, left and right submandibular, and left and right group II and III neck lymph nodes), according to an example of the present disclosure.

FIG. 6A is an axial slice illustrating the CT image and the organ segmentations, according to an example of the present disclosure.

FIG. 6B is a 3D display of the organ segmentations, according to an example of the present disclosure.

FIG. 6C is a sagittal slice illustrating the CT image and the organ segmentations, according to an example of the present disclosure.

FIG. 6D is a coronal slice illustrating the CT image and the organ segmentations, according to an example of the present disclosure.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The present disclosure related to a deep learning framework for automatic segmentation of organs from the head and neck region including brainstem, chiasm, mandible, left and right optic nerves, left and right parotids, left and right submandibulars, left and right eyes, left and right mid ears, left and right temporo mandibular joints, spinal cord, pituitary, left and right inner ears, larynx, oral cavity, thyroid, esophagus, left and right brachial plexuses, lips, pharynx, left and right masseters, left and right temporalis, left and right lateral pterygoids, left and right medial pterygoids, left and right temporal lobes, left and right cerebellums, left and right lens, left and right cochleas, brain, and left and right group II and III neck lymph nodes. The disclosure is not limited to these forty-eight organs and can be easily extended to other organs.

Figure 1:
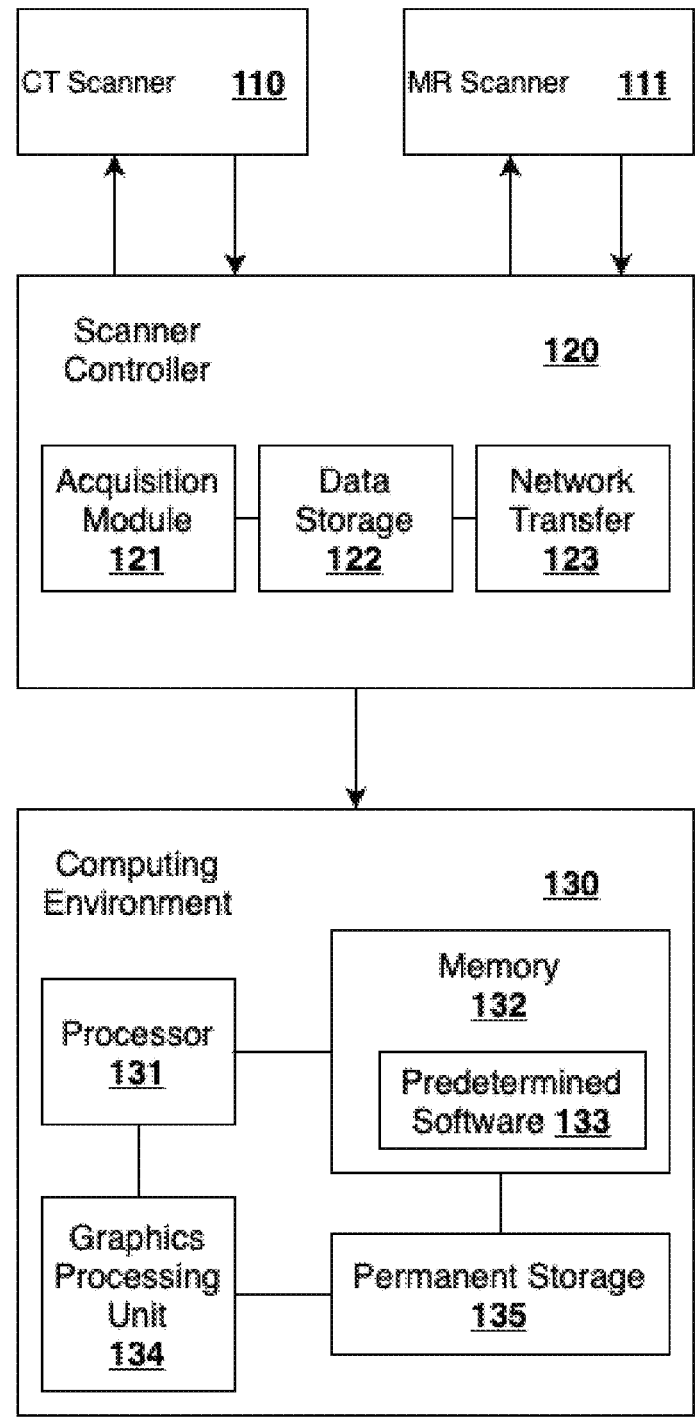
FIG. 1 is a system diagram of CT scanner, MR scanner, controller, and computing environment illustrating an operating environment capable of implementing aspects of the present disclosure.

FIG. 1 shows a system diagram of CT scanner 110, MR scanner 111, controller 120 and computing environment 130. The CT scanner 110 is used to obtain CT images covering the head and neck region of a subject and is controlled by the scanner controller 120. Alternatively, the MR scanner 111 is used to obtain CT images covering the head and neck region of a subject and is controlled by the scanner controller 120. The scanner controller 120 contains the acquisition module 121 that drives the CT scanner 110 or MR scanner 111, the data storage module 122 that stores the CT or MR images of different subjects, and the network transfer module 123 that sends the CT or MR images to another computing environment 130. The computing environment 130 contains processor 131, graphics processing unit 134, memory 132, and permanent storage 135 to perform given directions. In executing the directions, the predetermined software 133 is loaded into memory 132 and executed by processor 131 to yield the desired output.

The processing component 120 typically controls overall operations of the computing environment 130, such as the operations associated with display, data acquisition, data communications, and image processing. The processor 131 may include one or more processors to execute instructions to perform all or some of the steps in the above described methods. Moreover, the processor 131 may include one or more modules which facilitate the interaction between the processor 131 and other components. The processor may be a Central Processing Unit (CPU), a microprocessor, a single chip machine, a graphic processing unit (GPU), or the like. GPU 134 can include one or more GPUs interconnected to execute one or more GPU executable programs.

The memory 132 is configured to store various types of data to support the operation of the computing environment 130. Examples of such data comprise instructions for any applications or methods operated on the computing environment 130, CT or MR datasets, image data, etc. The memory 132 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

In an embodiment, the computing environment 130 may be implemented with one or more application specific integrated circuits (ASICs), digital signal processors (DSPs), digital signal processing devices (DSPDs), programmable logic devices (PLDs), field programmable gate arrays (FPGAs), GPUs, controllers, micro-controllers, microprocessors, or other electronic components, for performing the above methods.

The automatic head and neck organs segmentation method using a deep learning framework is programmed as one set of predetermined software 133 and installed on the computing environment 130. When the computing environment 130 receives CT or MR images from scanner controller 120, the predetermined software 133 is executed to generate the segmentation results.

FIG. 2 shows an example flow chart setting forth the steps of a method 200 in accordance with the present disclosure.

In step 210, 3D CT or MR images covering the head and neck region are received.

In step 212, the 3D CT images are processed to transform to patient coordinate system and have the same spatial resolution and matrix size.

Different scanners can have different imaging protocols relating to field-of-view (in the z-direction), pixel spacing and axial slice thickness. To reduce the variability within the dataset, the input images from both training and testing set were uniformly resampled to have axial in-plane resolution of 1.5×1.5 mm$^2$ and 3 mm slice-thickness. The in-plane matrix size was fixed to 256×256 so that the corresponding field-of-view was 384×384 mm$^2$. After resampling, each 3D image was center cropped or zero padded in the axial plane to get a matrix size of 256×256. The final 3D image matrix size was 256×256×N, where N denotes the number of axial slices. Resampling the images to the same voxel spacing was assumed to help as well since it reduced the variability in the organ sizes measured in matrix size and brought the testing case distribution closer to the training case distribution.

The steps in pre-processing include transforming to patient coordinate system, intensity cropping and normalization and generation of label maps for training cases. To transform to the patient coordinate system, the images are rotated based on the patient orientation. For CT images, the voxel intensity values outside of −1000 to 600 Hounsfield units (HU) were set to −1000 and 600, respectively. Similarly, for MR images the upper and lower threshold limits were decided based on the $95^{th}$ and $1^{st}$ percentile intensity values and then the values outside the upper and lower limit were set to those corresponding values. Finally, the images were normalized to the range [0, 1]. For training cases, of which the ground-truth contours were available, the corresponding label maps were generated using the same pre-processing pipeline with the values at each voxel indicating its region-of-interest (ROI) label.

In step 214, a deep learning framework using CNN models is built for organ segmentation.

Figure 3:
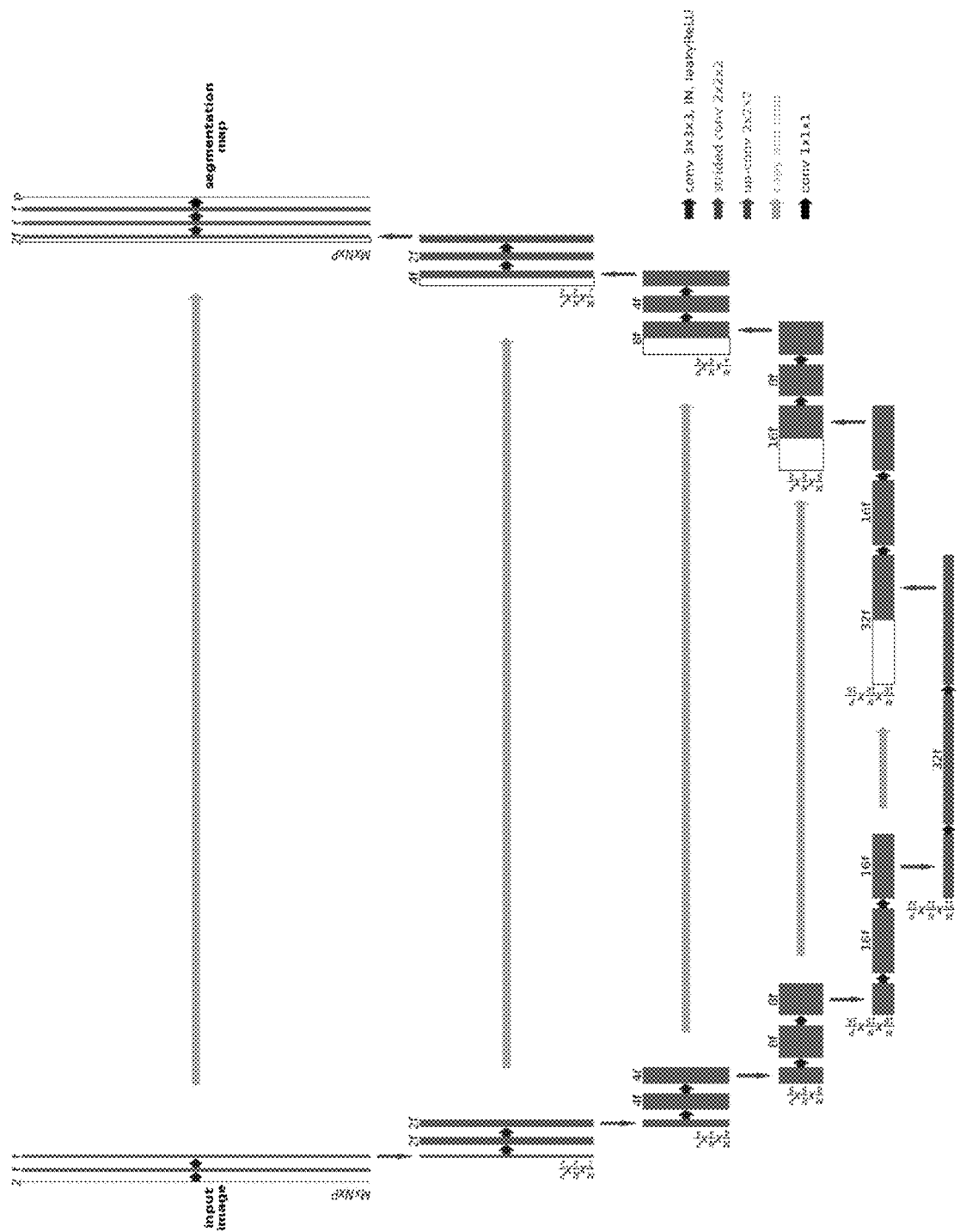
FIG. 3 is a convolutional neural network structure, according to an example of the present disclosure.

FIG. 3 shows a CNN model-based 3D U-Net structure used in this application. The general structure of U-Net comprises encoding and decoding blocks, where each encoding block consists of two consecutive 3D convolutional layers, followed by instance normalization and leaky rectified linear activation layers. A large number of features were used in the first encoding block to improve the expressiveness of the network. Similar to conventional U-Net structure, the spatial dimension was halved whereas the number of features was doubled during each encoding block. For the decoding blocks, symmetric blocks were used with skip-connections from corresponding encoding blocks, with 3D convolutional layers replaced by 3D transposed convolutional layers. M, N, P, f, and p are parameters that are unique for each network. The input images are first resampled and then center-cropped to M×N×P and the number of features is set to be smaller than was used in the original U-Net. M is the image size along the superior-inferior direction, N is along the anterior-posterior direction and P is along the left-right direction. Since a large number of ROIs are supported for the head neck region, multiple models were trained by distributing the total ROIs among them. Thus, the final segmentation map contained a different number of classes per model.

The 3D U-Net architecture can fully exploit the volumetric spatial information and thus is a preferred choice for 3D organ segmentation. It is often trained end-to-end from input images and the corresponding labels with the same size. However, using the entire 3D head neck images as the input is limited by the GPU memory and is suboptimal in terms of training time and accuracy as there are a large number of irrelevant voxels for segmentation of a specific organ, which may also lead to an increase in the number of false positives. Therefore, to utilize the training data more effectively, a patch-based segmentation approach was applied where smaller patches were extracted from each subject. Finally, the segmentation results for each organ are resampled to the original image size and merged from multiple models together to obtain the final label map.

During training, data augmentation is performed by applying random translations, rotations and scaling to the input images and the corresponding ground-truth label maps at each iteration. After applying the random transformations to the label maps, a threshold value of 0.5 is applied to each interpolated organ segmentation to convert back to binary values.

For each organ, a 3D U-Net with the same network structure shown in FIG. 3 is used for foreground and background segmentation. Although the imbalance of the foreground and background voxels is reduced with the cropped images, the weighted cross-entropy loss is still used for smaller organs to increase the sensitivity.

For further evaluation, when ground-truth contours are available, the automatic segmentation results can be evaluated using the Dice coefficient, mean surface distance (MSD), and 95% Hausdorff distance. The Dice coefficient (D) is calculated as:

$$D = \frac{2|X \cap Y|}{|X| + |Y|}$$

where X and Y are the ground truth and the algorithm segmented contours, respectively. The directed average Hausdorff measure is the average distance of a point in X to its closest point in Y, given as $$\vec{d}_{H,avg}(X, Y) = \frac{1}{|X|} \sum_{x \in |X|} \min_{y \in |Y|} d(x, y)$$

The MSD is then defined as the average of the two directed average Hausdorff measures:

$$MSD = \frac{\vec{d}_{H,avg}(X, Y) + \vec{d}_{H,avg}(Y, X)}{2}$$

The 95% directed percent Hausdorff measure is the 95$^{th}$ percentile distance over all distances from points in X to their closest point in Y. Denoting the 95$^{th}$ percentile as $K_{95}$, this is given as:

$$\vec{d}_{H,95}(X, Y) = K_{95}(\min_{y \in |Y|} d(x, y)) \; \forall \; x \in X$$

The undirected 95% Hausdorff distance (HD95) is then defined as the average of the two directed distances:

$$HD95 = \frac{\vec{d}_{H,95}(X, Y) + \vec{d}_{H,95}(Y, X)}{2}$$

Table I shows the performances evaluated by Dice, MSD and HD95 on a separate testing dataset.

TABLE 1

Dice scores, MSD and HD of the testing dataset

| ROI | Dice | MSD (mm) | HD95 (mm) |
|---|---|---|---|
| BrainStem | 0.846 ± 0.034 | 1.734 ± 0.413 | 4.672 ± 1.446 |
| Chiasm | 0.507 ± 0.15 | 1.332 ± 0.531 | 3.825 ± 1.113 |
| Mandible | 0.896 ± 0.021 | 0.853 ± 0.195 | 3.373 ± 0.843 |
| OpticNerve_L | 0.625 ± 0.112 | 1.084 ± 0.636 | 4.086 ± 2.893 |
| OpticNerve_R | 0.656 ± 0.091 | 1.017 ± 0.496 | 4.13 ± 2.552 |
| Parotid_L | 0.848 ± 0.047 | 1.501 ± 0.404 | 4.577 ± 1.326 |
| Parotid_R | 0.855 ± 0.055 | 1.488 ± 0.568 | 4.601 ± 1.797 |
| Submandibular_L | 0.807 ± 0.048 | 1.288 ± 0.307 | 4.035 ± 0.953 |
| Submandibular_R | 0.785 ± 0.053 | 1.473 ± 0.282 | 4.853 ± 1.061 |
| Eye_L | 0.902 ± 0.03 | 0.861 ± 0.341 | 2.681 ± 0.927 |
| Eye_R | 0.909 ± 0.012 | 0.801 ± 0.191 | 2.62 ± 0.439 |
| MidEar_L | 0.817 ± 0.071 | 1.186 ± 0.482 | 3.809 ± 1.115 |
| MidEar_R | 0.798 ± 0.075 | 1.275 ± 0.496 | 3.931 ± 1.097 |
| TMJ_L | 0.704 ± 0.087 | 1.606 ± 0.526 | 4.152 ± 1.183 |
| TMJ_R | 0.765 ± 0.085 | 1.255 ± 0.57 | 3.263 ± 0.946 |
| SpinalCord | 0.815 ± 0.034 | 1.062 ± 0.158 | 2.703 ± 0.371 |
| Pituitary | 0.588 ± 0.236 | 1.053 ± 0.728 | 2.618 ± 0.972 |
| InnerEar_L | 0.803 ± 0.035 | 0.904 ± 0.262 | 3.007 ± 0.513 |
| InnerEar_R | 0.815 ± 0.052 | 0.829 ± 0.326 | 2.789 ± 0.692 |
| Lens_L | 0.709 ± 0.09 | 0.638 ± 0.263 | 2.02 ± 0.582 |
| Lens_R | 0.735 ± 0.067 | 0.624 ± 0.221 | 2.089 ± 0.345 |
| TemporalLobes_L | 0.829 ± 0.051 | 2.684 ± 0.932 | 8.71 ± 3.006 |
| TemporalLobes_R | 0.84 ± 0.037 | 2.568 ± 0.669 | 8.39 ± 2.273 |
| Larynx | 0.877 ± 0.036 | 1.668 ± 0.598 | 4.39 ± 2.263 |
| OralCavity | 0.864 ± 0.032 | 2.282 ± 0.511 | 6.51 ± 1.47 |

TABLE 1-continued

Dice scores, MSD and HD of the testing dataset

| ROI | Dice | MSD (mm) | HD95 (mm) |
|---|---|---|---|
| Thyroid | 0.759 ± 0.142 | 1.401 ± 0.608 | 3.837 ± 1.18 |
| Esophagus | 0.756 ± 0.059 | 1.638 ± 0.528 | 5.394 ± 2.246 |
| Plexus_L | 0.512 ± 0.062 | 2.609 ± 1.071 | 10.832 ± 5.694 |
| Plexus_R | 0.523 ± 0.078 | 2.098 ± 0.606 | 7.599 ± 3.651 |
| Lips | 0.66 ± 0.052 | 1.323 ± 0.249 | 3.967 ± 0.75 |
| Pharynx | 0.63 ± 0.088 | 1.433 ± 0.388 | 4.389 ± 1.253 |
| Masseter_L | 0.907 ± 0.013 | 0.871 ± 0.084 | 2.888 ± 0.536 |
| Masseter_R | 0.909 ± 0.013 | 0.855 ± 0.099 | 2.853 ± 0.591 |
| Temporalis_L | 0.859 ± 0.044 | 1.102 ± 0.54 | 3.869 ± 2.355 |
| Temporalis_R | 0.867 ± 0.027 | 0.98 ± 0.214 | 3.348 ± 1.11 |
| LatPterygoid_L | 0.881 ± 0.017 | 0.865 ± 0.134 | 2.922 ± 0.519 |
| LatPterygoid_R | 0.877 ± 0.023 | 0.874 ± 0.182 | 3.179 ± 0.711 |
| MedPterygoid_L | 0.839 ± 0.03 | 1.2 ± 0.248 | 3.665 ± 0.912 |
| MedPterygoid_R | 0.85 ± 0.028 | 1.113 ± 0.242 | 3.589 ± 1.007 |
| Brain | 0.973 ± 0.005 | 1.104 ± 0.176 | 3.978 ± 1.186 |
| Cerebellum_L | 0.658 ± 0.204 | 4.338 ± 1.899 | 12.102 ± 5.241 |
| Cerebellum_R | 0.702 ± 0.16 | 3.861 ± 1.632 | 11.204 ± 4.703 |

FIG. 7 shows all automatically segmented organs on a test case using the proposed framework. FIGS. 7A, 7C, and 7D show the axial, sagittal, and coronal slices, respectively. FIG. 7B shows the 3D view of the segmentations. All organs have satisfactory contours with no obvious mistakes. Minimal human interaction is needed.

One of the challenges in deep learning-based models is the reliance on training data. Incomplete labeling is a common issue in training datasets, especially when dealing with a large number of ROIs. Therefore, a deep learning framework needs to be adapted to be compatible with incomplete training data. One solution to handle incomplete training data is to simply throw away data with incomplete labeling; however, it is a waste of resources as these data contain useful information. The following method is developed to take advantage of all available data.

During training, ambiguity is introduced in the loss function to avoid punishing the missing organs. More specifically, with the cross-entropy loss function (CE), only voxels from labeled organs are counted; with the Dice loss function (D), the Dice is ignored for missing organs. The following equations give the corresponding loss functions when there are no missing organs, i.e., contours when all organs exist:

$$CE = -\sum_{c=1}^{6} y_{o,c} \log\log(p_{o,c})$$

$$D = 1 - \frac{1}{5} * \sum_{k=1}^{5} d_c$$

$$d_c = \frac{2.0 * \text{intersection}}{\text{union}}$$

in which $y_{o,c}=1$ for the correct label for voxel o. When there are missing organs, CE is modified to have $y_{o,c}=0$ for all c to ignore all background voxels and the missing organs are ignored; D is modified to ignore the missing organs as well.

In step 216, the size of the training dataset is doubled by emulating uncollected training data with mirrored images and their corresponding labels. Since the head and neck region is symmetric along the left-right direction, a random mirroring (flip) along the left-right was performed with a 50% probability of being flipped in training. After flipping/mirroring, all the organs that have their left and right counterparts (i.e., right eye and left eye) were found and the labels were swapped to have the anatomically correct labeling.

In testing, according to step 218, each 3D image is flipped in the left-right direction, and the final prediction is calculated as an average of prediction on original and flipped images.

In the final step 220, since there may be overlaps in the cropped images for multiple organs, it is possible that the same voxel had a probability larger than 0.5 from multiple organ segmentation networks, meaning it would be classified as the foreground of multiple organs. To resolve such conflicts, the label for a particular voxel is chosen based on the maximum probability value greater than 0.5, and a single connected region is retained for each organ. Finally, the label maps are resampled to the same dimension as the original input before pre-processing and the corresponding contours are automatically calculated using the marching squares algorithm on each axial slice to get the segmentation results in DICOM-RT format.

For post-processing, overfitting is a potential issue, as any rule-based post-processing method may not apply to all cases. In this study, we do a simple 3D-connection analysis to remove small, isolated regions, which is shown to be helpful in most cases. Other methods, such as Gaussian smoothing, help on certain failed cases. Further post-processing may depend on the probability output of the network, which can also be used to predict the reliability of the network without ground truth so that the application of post-processing can be case specific.

What is claimed is:

1. A computer-implemented method for automatic segmentation of head and neck organs using one or more processors, the method comprising:
   prepare a training dataset, wherein the step of preparing a training dataset comprises:
   receive 3D images covering head and neck region obtained by a CT system or an MRI system;
   receive metadata for each received 3D images, comprising patient orientation, pixel spacing, slice thickness and matrix size;
   receive corresponding 3D segmentation labels map for the received 3D images; and
   process the received 3D images and the corresponding 3D segmentation labels map by transforming to patient coordinate system and resampling to have a fixed spatial resolution and a fixed matrix size;
   build a deep learning framework using CNN models for organ segmentation;
   train CNN models using the training dataset and performing data emulation step during training by optionally mirroring the processed 3D images and their corresponding processed 3D segmentation labels map from the training dataset;
   prepare a testing dataset, wherein the step of preparing a testing dataset comprises:
   receive 3D images covering head and neck region obtained by a CT system or an MRI system;
   receive metadata for each received 3D images, comprising patient orientation, pixel spacing, slice thickness and matrix size; and
   process the received 3D images by transforming to patient coordinate system and resampling to have a fixed spatial resolution and a fixed matrix size;
   deploy the trained CNN models on testing dataset, wherein the testing step comprises:
   mirror the processed 3D images in the left-right direction;
   predict on the processed 3D images and mirrored 3D images with individual prediction outputs as 3D probabilities map for organ segmentation; and improve the segmentation performance by averaging the 3D probabilities map outputs from the processed 3D images and mirrored 3D images; and post-process the 3D probabilities map outputs from the deep learning framework to obtain final 3D segmentation labels map for organ segmentation.

2. The computer-implemented method for automatic segmentation of head and neck organs according to claim 1, wherein the method of processing the received 3D images and the corresponding 3D segmentation labels map comprises:

rotate the received 3D images to match patient coordinate system based on the received patient orientation metadata;

rotate the 3D segmentation labels map to match the rotated 3D images;

resize the transformed 3D images and 3D segmentation labels map to have a fixed pixel spacing, and a fixed matrix size; and apply lower and upper thresholds on the image intensities.

3. The computer-implemented method for automatic segmentation of head and neck organs according to claim 1, performing data emulation step during training by optionally mirroring the processed 3D images and their corresponding processed 3D segmentation labels map comprises:

randomly decide whether to mirror or not;
if decide to mirror,
mirror processed 3D images and their corresponding processed 3D segmentation labels map in the left-right direction;
find labels in the 3D segmentation labels map for organs that have their left and right counterparts; and
swap the labels in the 3D segmentation labels map for those organs that have their left and right counterparts to have anatomically correct labeling; and
if decide not to mirror,
use the processed 3D images and their corresponding processed 3D segmentation labels map.

4. The computer-implemented method for automatic segmentation of head and neck organs according to claim 1, predicting on the processed 3D images and mirrored 3D images with individual prediction outputs as 3D probabilities map for organ segmentation comprises:

predict on the processed 3D images to output a 3D probabilities map; and predict on the mirrored 3D images to output a 3D probabilities map and mirror the predicted 3D probabilities map along the left-right direction to match the output from processed 3D images.

5. The computer-implemented method for automatic segmentation of head and neck organs according to claim 1, post-process the 3D probabilities map outputs from the deep learning framework to obtain final 3D segmentation labels map for organ segmentation comprises:

merge the outputs from different CNN models and resolving the conflicts based on the probabilities.

6. An apparatus for automatic segmentation of head and neck organs, comprising:

one or more processors;
a display; and
a non-transitory computer readable memory storing instructions executable by the one or more processors, wherein the instructions are configured to:
prepare a training dataset, wherein the step of preparing a training dataset comprises:
receive 3D images covering head and neck region obtained by a CT system or an MRI system;
receive metadata for each received 3D images, comprising patient orientation, pixel spacing, slice thickness and matrix size;
receive corresponding 3D segmentation labels map for the received 3D images; and
process the received 3D images and the corresponding 3D segmentation labels map by transforming to patient coordinate system and resampling to have a fixed spatial resolution and a fixed matrix size;
build a deep learning framework using CNN models for organ segmentation;
train CNN models using the training dataset and performing data emulation step during training by optionally mirroring the processed 3D images and their corresponding processed 3D segmentation labels map from the training dataset;
prepare a testing dataset, wherein the step of preparing a testing dataset comprises:
receive 3D images covering head and neck region obtained by a CT system or an MRI system;
receive metadata for each received 3D images, comprising patient orientation, pixel spacing, slice thickness and matrix size; and
process the received 3D images by transforming to patient coordinate system and resampling to have a fixed spatial resolution and a fixed matrix size;
deploy the trained CNN models on testing dataset, wherein the testing step comprises:
mirror the processed 3D images in the left-right direction;
predict on the processed 3D images and mirrored 3D images with individual prediction outputs as 3D probabilities map for organ segmentation; and
improve the segmentation performance by averaging the 3D probabilities map outputs from the processed 3D images and mirrored 3D images; and
post-process the 3D probabilities map outputs from the deep learning framework to obtain final 3D segmentation labels map for organ segmentation.

7. The apparatus for automatic segmentation of head and neck organs according to claim 6, wherein the method further comprises:

rotate the received 3D images to match patient coordinate system based on the received patient orientation metadata;

rotate the 3D segmentation labels map to match the rotated 3D images;

resize the transformed 3D images and 3D segmentation labels map to have a fixed pixel spacing and a fixed matrix size; and apply lower and upper thresholds on the image intensities.

8. The apparatus for automatic segmentation of head and neck organs according to claim 6, wherein the method further comprises:

randomly decide whether to mirror or not;
if decide to mirror,
mirror processed 3D images and their corresponding processed 3D segmentation labels map in the left-right direction;
find labels in the 3D segmentation labels map for organs that have their left and right counterparts; and
swap the labels in the 3D segmentation labels map for those organs that have their left and right counterparts to have anatomically correct labeling; and
if decide not to mirror,
use the processed 3D images and their corresponding processed 3D segmentation labels map.

9. The apparatus for automatic segmentation of head and neck organs according to claim 6, wherein the method further comprises:
   predict on the processed 3D images to output a 3D probabilities map; and
   predict on the mirrored 3D images to output a 3D probabilities map and mirror the predicted 3D probabilities map along the left-right direction to match the output from processed 3D images.

10. The apparatus for automatic segmentation of head and neck organs according to claim 6, wherein the method further comprises:
   merge the outputs from different CNN models and resolving the conflicts based on the probabilities.

11. A non-transitory computer-readable storage medium having stored therein instructions that, when executed by one or more processors of an apparatus causing the apparatus to perform acts comprising:
   prepare a training dataset, wherein the step of preparing a training dataset comprises:
   receive 3D images covering head and neck region obtained by a CT system or an MRI system;
      receive metadata for each received 3D images, comprising patient orientation, pixel spacing, slice thickness and matrix size;
      receive corresponding 3D segmentation labels map for the received 3D images; and
      process the received 3D images and the corresponding 3D segmentation labels map by transforming to patient coordinate system and resampling to have a fixed spatial resolution and a fixed matrix size;
   build a deep learning framework using CNN models for organ segmentation;
   train CNN models using the training dataset and performing data emulation step during training by optionally mirroring the processed 3D images and their corresponding processed 3D segmentation labels map from the training dataset;
   prepare a testing dataset, wherein the step of preparing a testing dataset comprises:
      receive 3D images covering head and neck region obtained by a CT system or an MRI system;
      receive metadata for each received 3D images, comprising patient orientation, pixel spacing, slice thickness and matrix size; and
      process the received 3D images by transforming to patient coordinate system and resampling to have a fixed spatial resolution and a fixed matrix size;
   deploy the trained CNN models on testing dataset, wherein the testing step comprises:
      mirror the processed 3D images in the left-right direction;
      predict on the processed 3D images and mirrored 3D images with individual prediction outputs as 3D probabilities map for organ segmentation; and
      improve the segmentation performance by averaging the 3D probabilities map outputs from the processed 3D images and mirrored 3D images; and
   post-process the 3D probabilities map outputs from the deep learning framework to obtain final 3D segmentation labels map for organ segmentation.

* * * * *